United States Patent Office

3,625,725
Patented Dec. 7, 1971

3,625,725
SATIN WHITE-CLAY COMPOSITIONS AND
METHODS OF MANUFACTURE
Robert F. Conley, Scotch Plains, and Mary Kate Lloyd, Westfield, N.J., and Billy Reid Catherwood, Macon, Ga., assignors to Georgia Kaolin Company
Filed Apr. 24, 1969, Ser. No. 818,877
Int. Cl. C09c 1/02
U.S. Cl. 106—306
6 Claims

ABSTRACT OF THE DISCLOSURE

A coating pigment composition of kaolin and satin white is provided in which the kaolin is classified from natural kaolin deposits to a particle size of about 80% to 96% by weight less than $2\mu$, about 55% to 85% less than $1\mu$, and no more than about 10% less than $0.2\mu$, said size values being determined by the standard centrifugal-hydrometer method.

---

Figure 1:
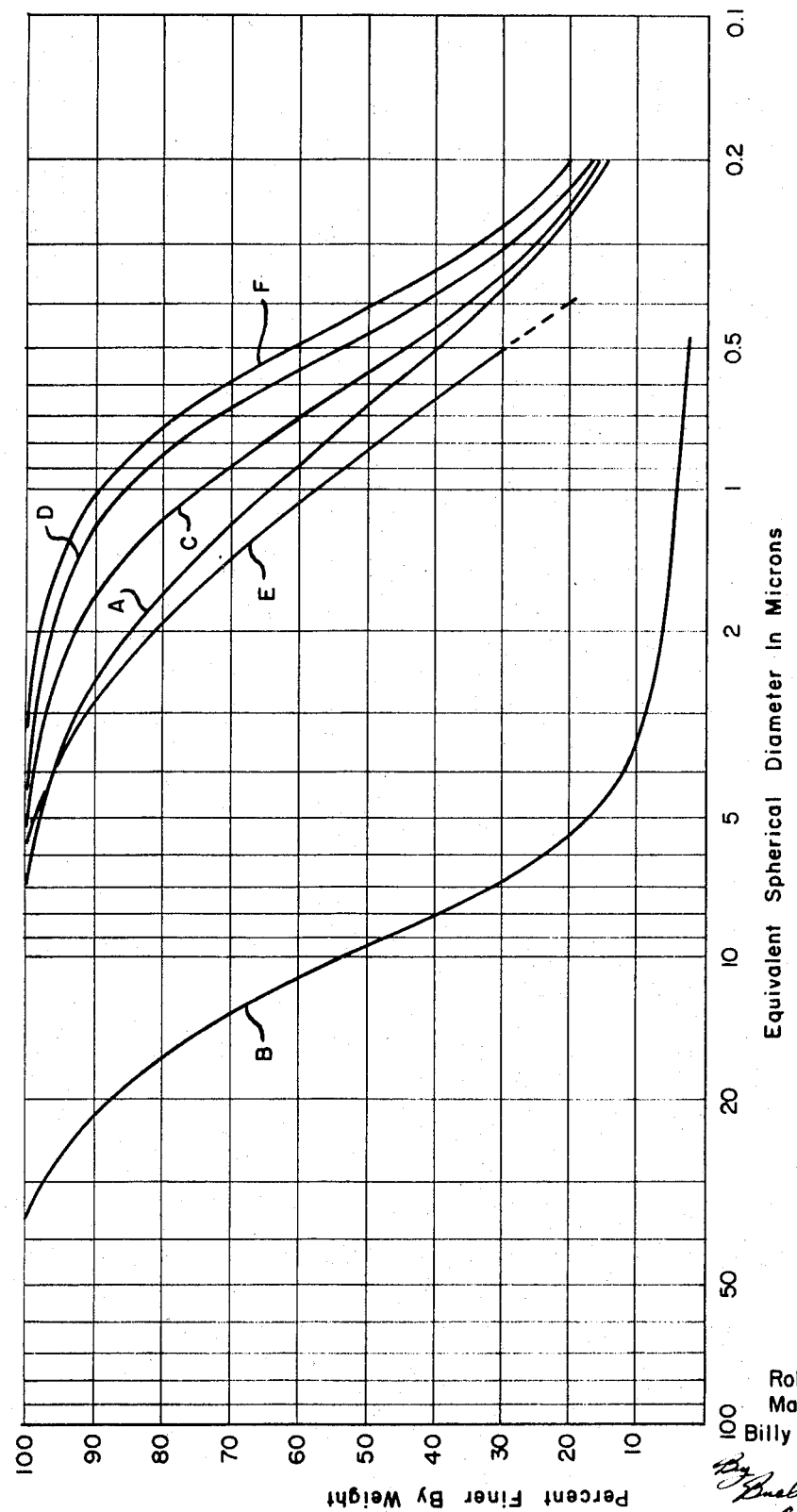

This invention relates to satin white-clay compositions and methods of manufacture and particularly to improvements in optical properties of coated paper by application of specific satin white-clay compositions thereto. More specifically, this invention relates to an improved coating pigment used in the coating of paper and to the processing of improved satin white-clay pigments.

In the commercial operation of coating paper, dispersions of kaolinite and adhesive, along with other pigments usually of high refractive index, are roll or blade coated onto a moving paper sheet and dried thereon. It has been observed that the presence of micro-voids in the dried coating improve certain optical properties, notably opacity and gloss, and to a lesser extent brightness and whiteness. One mode of introduction of controlled voids is by the use of certain acicular pigments in small concentrations. It has been theorized that such pigments take up space by "brush pile" configuration and slowly release water during the drying process and thus introduce voids of a size related to the particle length.

One such material is known in the trade as "Satin White," a calcium sulfo-aluminate of somewhat indefinite composition, but believed to be primarily $$3CaO \cdot Al_2O_3 \cdot 3CaSO_4 \cdot 32H_2O$$

Satin white, as now known in the trade, is produced by mixing a solution of calcium hydroxide with one of aluminum sulfate in stoichiometric proportions. The chief problem in the manufacture of satin white is stability—it must be kept in water suspension, usually at about 25% solids. It is well recognized that drying satin white destroys it, together with the useful optical properties it imparts. It is observed that the suspension is even degraded at temperatures above 75° C. While 75% water may be higher than necessary for its stability, the extremely thixotropic viscosity of satin white in water makes it completely impractical to handle at solids much higher than 25%. The high water content introduces several commercial problems. Shipping costs are exorbitant and shipping is prohibited where exposure to cold weather results. The latter problem arises because freezing of the water in satin white also destroys the pigmentary characteristics. The "extra" water in satin white may dilute the coating composition and require additional drying time and costs for its removal.

We have previously found, as set forth in application Ser. No. 721,955, that premixing of satin white suspensions from the lime-alum precipitation with kaolinites and spray drying thereafter yields a powdery material containing 5% or less moisture and whose coating properties are not degenerated as a result of drying. We have now discovered that certain selected types of kaolinites when premixed with satin white suspensions give even better optical properties. The invention is more clearly set forth in the following detailed examples.

EXAMPLE I

A satin white composition is formulated by slurrying 5 parts of high purity lime in 75 parts water at room temperature and thoroughly mixing. A second solution of 25% aluminum sulfate is made up, a volume corresponding to about an $Al_2(SO_4)_3 \cdot 18H_2O/Ca(OH)_2$ weight ratio of 1.50. The aluminum sulfate solution is added slowly (about 30 minutes total) to the lime solution, so the temperature of the mixture does not rise above about 32° C. The precipitation is continued until a pH of 11.9 is reached. Thereafter a starch suspension is added in an amount corresponding to 10% by weight of the precipitated calcium alumino-sulfate, or about 1.35 parts dry starch based on lime formulation. Starch acts as a binder in the finished coating formulation and its addition to satin white improves the rheology somewhat.

The precipitate is pressure filtered to 25–26% solids. To 30 parts by weight of satin white solids is added 70 parts by weight of a broad particle size kaolinite which had been previously acid flocced, filtered and dried and whose size distribution is given by curve A in FIG. 1. The total solids were adjusted to about 35% by addition of 0.3% (total solids basis) of a dispersing chemical, sodium hexametaphosphate or sodium carbonate, in aqueous solution and the thin slurry spray dried in a Nichols Niro Utility spray drier (inlet temperature 280° C., outlet temperature 135° C.).

EXAMPLE II

A formulation similar to Example I, except that the kaolinite particle size was very coarse, designated by curve B in FIG. 1, was spray dried.

EXAMPLE III

A formulaion similar to Example I, except that a fine particle size kaolinite was employed, designated by curve C in FIG. 1, was spray dried.

EXAMPLE IV

A formulation similar to Example I, except that a kaolinite was employed whose particle size was slightly finer than that in Example III, designated by curve D in FIG. 1, was spray dried.

EXAMPLE V

A formulation similar to Example I, except that the solids composition was an 80–20 kaolinite-satin white ratio, was spray dried.

EXAMPLE VI

A formulation similar to Example II, except the solids composition was an 80–20 kaolinite-satin white ratio, was spray dried.

EXAMPLE VII

A formulation similar to Example III, except the solids composition was an 80–20 kaolinite-satin white ratio, was spray dried.

EXAMPLE VIII

A formulation similar to Example IV, except the solids composition was an 80–20 kaolinite-satin white ratio, was spray dried.

The dry formulations from Examples I–VIII were made into standard starch coating compositions and coated onto standardized paper rawstock sheet. The rheological and optical properties are set forth in Tables I and II.

It is apparent that kaolinite D, the finest particle size clay used, gave the best optical properties as well as the highest rheological values. The optical properties are desirable but the high rheological values are not.

Clays A through D are naturally occurring kaolins which have been bleached to remove iron and separated into their respective particle size fractions by commercial centrifuges. However, particle fineness should not be construed as an exclusive criterion for the kaolinite component in the pigment mixture. As seen from FIG. 1, the brightness (reflectance at 457 m$\mu$) trend of the dry kaolinite precursor parallels those of the spray dried composite. However, gloss and opacity, which likewise have parallel trends, are due more directly to particle fineness of the kaolinite than to those optical properties mentioned. Rheology, particularly at low shear (Brookfield 10 r.p.m.), shows a pronounced improvement with large particle size kaolinite, the trend again following particle size.

TABLE I

| Specimen | Pigment composition | Percent solids | pH | Brookfield viscosity, cp. at— | |
|---|---|---|---|---|---|
| | | | | 10 r.p.m. | 100 r.p.m. |
| 1 | 70 A-30 S | 38.4 | 9.4 | 1,520 | 512 |
| 2 | 70 B-30 S | 38.8 | 9.6 | 880 | 360 |
| 3 | 70 C-30 S | 38.5 | 9.8 | 2,040 | 560 |
| 4 | 70 D-30 S | 38.0 | 9.7 | 2,640 | 584 |
| 5 | 80 A-20 S | 37.8 | 9.7 | 640 | 232 |
| 6 | 80 B-20 S | 37.5 | 9.8 | 240 | 172 |
| 7 | 80 C-20 S | 38.3 | 9.9 | 1,200 | 296 |
| 8 | 80 D-20 S | 38.3 | 9.6 | 1,120 | 432 |

TABLE II

| Specimen | Coat weight, lb./rm. | 75° gloss | 75° gloss [1] | Reflectance at 457 m$\mu$ | Reflectance[1] at 457 m$\mu$ | Whiteness[2] index | Whiteness[1] index | Percent opacity[3] | Percent opacity[1] |
|---|---|---|---|---|---|---|---|---|---|
| 1 | 5.3 | 2.6 | 18.6 | 76.2 | 75.2 | 24.8 | 26.4 | 92.8 | 92.5 |
| 2 | 5.3 | 2.0 | 12.2 | 74.1 | 73.2 | 28.1 | 28.8 | 91.6 | 91.1 |
| 3 | 5.3 | 5.0 | 21.6 | 76.5 | 75.2 | 24.6 | 25.9 | 92.7 | 92.0 |
| 4 | 5.2 | 5.2 | 23.2 | 77.0 | 75.8 | 23.5 | 24.9 | 93.4 | 92.3 |
| 5 | 5.3 | 3.0 | 18.0 | 75.9 | 74.3 | 25.1 | 26.6 | 93.3 | 92.5 |
| 6 | 5.2 | 2.0 | 12.8 | 73.1 | 72.6 | 28.6 | 29.1 | 91.5 | 91.2 |
| 7 | 5.3 | 4.0 | 20.8 | 75.9 | 74.7 | 25.0 | 26.4 | 92.4 | 92.2 |
| 8 | 5.3 | 5.2 | 23.2 | 76.1 | 74.8 | 24.5 | 25.3 | 93.4 | 92.4 |

[1] Calendered 2 nips at 5 p.s.i.g.
[2] Reflectance difference, 700 m$\mu$-400 m$\mu$.
[3] Reflectance difference at 530 m$\mu$ over white/black.

Natural kaolins can be mechanically processed, e.g., as set forth by U.S. 3,075,710 and 2,904,267, to yield particles which are more laminar, i.e. with an increased diameter to thickness (aspect) ratio. A material thus processed and characterized by an abundance of large plates (10 m$\mu$ diameter or larger) with aspect ratios equal to or greater than 10:1 (though hydrometer analysis indicates them to be smaller) was designated clay E, a particle size analysis appears in FIG. 1.

EXAMPLE IX

A composition containing 70% clay E and 30% satin white was formulated as in previous examples and coated onto standardized paper rawstock.

EXAMPLE X

A composition containing 80% clay E and 20% satin white was processed as set forth in Example IX.

EXAMPLE XI

A composition containing 70% clay D and 30% satin white was processed as set forth in Example IX.

EXAMPLE XII

A composition similar to Example IX but containing 100% clay E as pigment was processed as set forth in Example IX.

Specimens from Examples IX, XI, and XII were coated onto a standardized paper rawstock, specimen XI corresponding to previous specimen 4. The rheological and optical properties are set forth in Tables III and IV.

TABLE III

| Specimen | Pigment composition | Percent solids | pH | Brookfield viscosity, cp. at— | |
|---|---|---|---|---|---|
| | | | | 10 r.p.m. | 100 r.p.m. |
| 9 | 70 E-30 S | 40.2 | 9.5 | 2,880 | 648 |
| 10 | 80 E-20 S | 39.7 | 9.4 | 720 | 344 |
| 11 | 70 D-30 S | 40.1 | 9.4 | 3,920 | 784 |
| 12 | 100 E | 44.7 | 7.0 | 720 | 184 |

TABLE IV

| Specimen | Coat weight, lb./rm. | 75° gloss | 75° gloss [1] | Reflectance at 457 m$\mu$ | Reflectance[1] at 457 m$\mu$ | Whiteness index | Whiteness[1] index | Percent opacity[1] |
|---|---|---|---|---|---|---|---|---|
| 9 | 5.2 | 3.8 | 25.4 | 76.6 | 74.2 | 23.1 | 25.6 | 91.5 |
| 10 | 5.2 | 3.2 | 24.8 | 76.5 | 74.7 | 23.7 | 25.6 | 92.0 |
| 11 | 5.2 | 5.8 | 28.4 | 76.5 | 74.9 | 23.6 | 25.9 | 91.9 |
| 12 | 5.1 | 4.0 | 21.2 | 75.2 | 73.9 | 26.8 | 28.1 | 91.6 |

[1] Calendered 2 nips at 5 p.s.i.g.

Specimens 9 and 10 exhibit the superior optical properties as observed with specimen 11 (see #4 also) and marked improvement in gloss and whiteness over the pure clay E, which itself is noted for superior optical properties over clays A, B, C, and D. However, rheologically, specimen 10 is much superior to specimen 11 and approaches a pure kaolin, known and employed for its low coating viscosity. Inasmuch as coating rheology is profoundly affected by the cooking of the starch binder, only members within a set, e.g., #1-8 or #9-12, can be compared (where a common cook is employed) and not cross-set members.

It is an interesting anomaly that very large, thin platelets, as occur in clay E, give equal to or superior results to a clay whose diameter is quite small and whose particles have a thicker aspect ratio. Particle packing would appear to be involved.

Another series of clay-satin white mixtures were formulated using the delaminated clay E essentially void of particles <0.2 m$\mu$ and a fine, high quality undelaminated clay whose particle size is designated by curve F.

EXAMPLE XIII

A composition containing 70% clay E and 30% satin white was formulated, processed, and coated onto standardized paper sheet by techniques set forth in previous examples; specimen 13 roughly corresponds to specimen 9.

EXAMPLE XIV

A composition containing 63% clay E, 7% clay F (90-10 clay mixture), and 30% satin white was formulated and processed as in Example 13.

EXAMPLE XV

A composition containing 56% clay E, 14% clay F (80-20 clay mixture), and 30% satin white was formulated and processed as in Example 13.

EXAMPLE XVI

A composition containing 49% clay E, 21% clay F (70-30 clay mixture), and 30% satin white was formulated and processed as in Example 13.

EXAMPLE XVII

A composition similar to Example 13, but containing 80% clay E and 20% satin white.

EXAMPLE XVIII

A composition similar to Example 14, but containing 72% clay E, 8% clay F (90-10 clay mixture), and 20% satin white.

EXAMPLE XIX

A composition similar to Example 15, but containing 64% clay E, 16% clay F (80-20 clay mixture), and 20% satin white.

EXAMPLE XX

A composition similar to Example 16, but containing 56% clay E, 24% clay F (70-30 clay mixture), and 20% satin white.

EXAMPLE XXI

A composition similar to Example 13, but containing 100% clay E as pigment.

EXAMPLE XXII

A composition similar to Example 13, but containing 100% clay F as pigment.

Specimens from Examples 13 through 22 were coated onto a standardized paper rawstock. The rheological and optical properties are listed in Tables V and VI.

TABLE V

| Specimen | Pigment composition | Percent solids | pH | Brookfield viscosity, cp. at— | |
|---|---|---|---|---|---|
| | | | | 10 r.p.m. | 100 r.p.m. |
| 13 | 70 E-30 S | 36.3 | 10.3 | 800 | 416 |
| 14 | 63 E-7F-30 S | 38.2 | 10.0 | 1,240 | 548 |
| 15 | 56 E-14F-30 S | 37.2 | 10.1 | 1,400 | 552 |
| 16 | 49 E-21F-30 S | 36.9 | 10.1 | 1,440 | 524 |
| 17 | 80 E-20 S | 37.1 | 10.1 | 800 | 352 |
| 18 | 72 E-8F-20 S | 37.1 | 10.1 | 600 | 324 |
| 19 | 64 E-16F-20 S | 37.7 | 10.1 | 920 | 408 |
| 20 | 56 E-24F-20 S | 37.2 | 10.1 | 960 | 380 |
| 21 | 100 E | 47.8 | 7.5 | 960 | 224 |
| 22 | 100 F | 45.4 | 7.3 | 1,880 | 344 |

TABLE VI

| Specimen | Coat weight, lb./rm. | 75° gloss | 75° gloss [1] | Reflectance at 457 mµ | Reflectance [1] at 457 mµ | Whiteness index | Whiteness [1] index | Percent opacity | Percent opacity [1] |
|---|---|---|---|---|---|---|---|---|---|
| 13 | 4.9 | 3.8 | 28.2 | 78.0 | 76.0 | 21.6 | 23.8 | 93.7 | 92.9 |
| 14 | 5.0 | 4.2 | 29.3 | 78.2 | 75.3 | 21.4 | 25.2 | 93.6 | 92.6 |
| 15 | 4.9 | 3.8 | (25.3) | 77.5 | 75.3 | 22.5 | 25.4 | 93.6 | 92.5 |
| 16 | 5.0 | 4.2 | 28.8 | 77.1 | 75.1 | 22.4 | 24.6 | 93.8 | 93.0 |
| 17 | 5.0 | 3.8 | 25.7 | 76.4 | 75.0 | 23.0 | 25.1 | 93.6 | 93.0 |
| 18 | 5.0 | 3.6 | 23.7 | 76.6 | 74.9 | 23.8 | 25.9 | 93.2 | 92.5 |
| 19 | 4.7 | 3.6 | 26.3 | 76.3 | 74.9 | 24.0 | 26.2 | 93.1 | 92.3 |
| 20 | 4.7 | 4.2 | 22.7 | 76.2 | 75.0 | 24.4 | 26.4 | 93.0 | 92.3 |
| 21 | 4.5 | 3.8 | 18.5 | 75.4 | 74.1 | 26.1 | 27.9 | 92.7 | 91.6 |
| 22 | 5.0 | 5.0 | 18.2 | 73.6 | 72.5 | 29.0 | 30.7 | 92.2 | 91.6 |

[1] Calendered 2 nips at 5 p.s.i.g.

The data in Tables V and VI indicate the presence of fine particle size clay in a composite of delaminated clay and satin white deteriorates the rheology of the coating formulation slightly and the optical properties of the coated paper significantly. Thus in processing kaolin and satin white for a coating pigment, it is advantageous to remove the fine kaolin fraction before combination and subsequent drying.

In addition to improving the quality of the product, removal of the fine kaolin fraction is beneficial to the processing. Specimens equivalent in composition to those cited in Examples 13, 14, 15, and 16 were formulated with 0.3% dispersing agent only. In place of spray drying these immediately, their viscosity as a function of aging time was measured and appears in Table VII.

TABLE VII

| Specimen | Pigment composition | Initial viscosity, [1] cp. at— | | Viscosity, cp. after— | |
|---|---|---|---|---|---|
| | | 10 r.p.m. | 100 r.p.m. | 2 days | 5 days |
| 13a | 70 E-30 S | 2,220 | 272 | 1,900/220 | 1,624/211 |
| 14a | 63 E-7 F-30 S | 2,440 | 256 | 1,800/236 | 1,760/236 |
| 15a | 56 E-14 F-30 S | 3,040 | 328 | 2,120/276 | 2,200/280 |
| 16a | 49 E-21 F-30 S | 3,240 | 362 | 2,720/316 | 2,380/298 |

[1] 25% solids, 0.1% $Na_2CO_3$+0.2% $(NaPO_3)_6$ added.

It is apparent that the presence of the fine particle size kaolin in the delaminated kaolin-satin white system increases the viscosity in some instances nearly 50%. As this mixture is a spray drying composition, the rate to the dryer is significantly reduced by the increase in viscosity. Reformulation after spray drying gives essentially the same viscosities and trends as are observed in Table VII, thus confirming the coating viscosity data in Table V.

Because of the limited solubility of calcium hydroxide, satin white is best precipitated under chemical conditions wherein about 10-11% satin white solids results. Commercial practice has been to pressure filter this dilute suspension to about 25%, the practical limit.

In spray drying the satin white-kaolin composite, two choices are available; (1) a 10% satin white slurry can be used with kaolin which yields an easily pumpable slurry composite, but with more water to dry; or (2) a 25% satin white slurry may be used for the composite with decreased water content, but more viscous rheology and lower pumping rate. Choice (1) circumvents a filtration step. The economics tend to be about equal for both alternatives. However, the rheological properties of the products differ decidely as shown with Examples 23-30 and the data in Tables VIII and IX.

EXAMPLE XXIII

Dry kaolin A was blunged with a precipitated satin white slurry containing 10.5% satin white solids so that a pigment ratio of 80% kaolin-20% satin white resulted at 38% total solids. The mixture was spray dried as in Example 1, formulated into a standard coating composition and paper coated as set forth in previous examples.

EXAMPLE XXIV

Dry kaolin A was blunged with a precipitated and pressure filtered slurry of the satin white in Example 23 which contained 25% satin white solids after filtering, the composite containing 80% kaolin-20% satin white at 38% total solids and treated subsequently as in Example 23.

EXAMPLE XXV

Dry kaolin A was processed in the same manner as in Example 23 except the pigment ratio was 70% kaolin-30% satin white.

EXAMPLE XXVI

Dry kaolin A was processed in the manner set forth in Example 24 except the pigment ratio was 70% kaolin-30% satin white.

EXAMPLE XXVII

Dry kaolin E was processed in the manner set forth in Example 23.

EXAMPLE XXVIII

Dry kaolin E was processed in the manner set forth in Example 24.

EXAMPLE XXIX

Dry kaolin E was processed in the manner set forth in Example 25.

EXAMPLE XXX

Dry kaolin E was processed in the manner set forth in Example 26.

TABLE VIII

| Specimen | Pigment composition | Percent solids | pH | Brookfield viscosity, cp. at— 10 r.p.m. | 100 r.p.m. |
|---|---|---|---|---|---|
| 23 | 80 A-20 S at 10% | 40.0 | 9.4 | 496 | 280 |
| 24 | 80 A-20 S at 25% | 40.0 | 9.5 | 320 | 216 |
| 25 | 70 A-30 S at 10% | 40.5 | 9.5 | 1,220 | 468 |
| 26 | 70 A-30 S at 25% | 40.3 | 9.5 | 672 | 390 |
| 27 | 80 E-20 S at 10% | 40.4 | 9.4 | 1,240 | 336 |
| 28 | 80 E-20 S at 25% | 40.9 | 9.6 | 1,000 | 380 |
| 29 | 70 E-30 S at 10% | 41.4 | 9.5 | 2,200 | 636 |
| 30 | 70 E-30 S at 25% | 40.8 | 9.5 | 1,400 | 480 |
| 31 | 100 A | 54.5 | 6.9 | 3,160 | 636 |
| 32 | 100 E | 54.7 | 7.0 | 7,680 | 1,220 |

TABLE IX

| Specimen | Coat weight, lb./rm. | 75° gloss | 75° gloss [1] | Reflectance at 457 mμ | Reflectance [1] at 457 mμ | Whiteness index | Whiteness [1] index | Percent opacity | Percent opacity [1] |
|---|---|---|---|---|---|---|---|---|---|
| 23 | 4.3 | 4.0 | 18.3 | 74.9 | 73.2 | 26.7 | 28.7 | 92.1 | 90.9 |
| 24 | 4.3 | 4.0 | 20.5 | 74.0 | 72.7 | 25.4 | 28.7 | 91.9 | 91.3 |
| 25 | 4.3 | 5.0 | 22.1 | 75.7 | 74.3 | 25.8 | 27.7 | 92.2 | 91.5 |
| 26 | 4.3 | 5.0 | 22.6 | 75.1 | 74.0 | 26.1 | 27.8 | 92.2 | 91.6 |
| 27 | 4.3 | 5.0 | 24.0 | 75.9 | 74.8 | 24.5 | 26.6 | 92.1 | 91.3 |
| 28 | 4.5 | 5.5 | 24.6 | 76.6 | 75.0 | 23.6 | 26.0 | 92.5 | 91.4 |
| 29 | 4.4 | 5.0 | 24.4 | 75.9 | 74.8 | 24.7 | 26.8 | 92.3 | 91.6 |
| 30 | 4.3 | 5.0 | 24.4 | 75.7 | 74.2 | 25.0 | 26.2 | 91.9 | 91.2 |
| 31 | 4.4 | 5.2 | 17.0 | 73.6 | 72.8 | 29.5 | 30.2 | 91.9 | 91.2 |
| 32 | 4.4 | 8.0 | 27.2 | 75.5 | 74.1 | 25.7 | 27.5 | 91.8 | 91.2 |

[1] Calendered 2 nips at 5 p.s.i.g.

With clays A and E there is little advantage in the use of either 10% or 25% satin white suspension as spray dryer feed on the basis of optical properties. There is an advantage rheologically, as the coating formulations show a decreased viscosity when the 25% solids satin white is employed in the composite spray dryer feed. In most optical and rheological properties the pre-filtered 25% satin white shows a distinct advantage over the pure clay component.

While we have illustrated and described certain preferred embodiments and practices of our invention, it will be understood that the invention may be otherwise embodied within the scope of the following claims.

We claim:

1. A dried particulate coating pigment composition of classified kaolin and satin white which may be made up into aqueous coating compositions comprising an effective amount of each of satin white and kaolin in which the kaolin is classified from natural kaolin deposits to a particle size of about 80% to 96% by weight less than 2 microns and about 55% to 85% less than 1 micron, but no more than about 10% less than 0.2 micron, said size values being determined by the standard centrifugal-hydrometer method.

2. A dried particulate coating pigment composition of classified kaolin and satin white which may be made up into aqueous coating compositions comprising an effective amount of each of satin white and kaolin in which the kaolin is particle size classified from natural kaolin deposits and measures about 96% by weight less than 2 microns and 85% less than 1 micron, but no more than about 20% less than 0.2 micron, said analysis being performed by the standard centrifugal-hydrometer method.

3. A coating pigment composition as in claim 1 in which the satin white content is present in an effective amount to retain the effectiveness of the satin white as a paper coating pigment on rewetting after drying but is not greater than about 30%.

4. A spray dried coating pigment composition as in claim 1 where the satin white is about 10%.

5. A dried particulate coating pigment composition of classified kaolin and satin white which may be made up into aqueous coating compositions comprising satin white and kaolin in which the kaolin is a mechanically delaminted material which is further particle size classified to yield about 80% by weight less than 2 microns, about 55% less than 1 micron and no more than about 10% less than 0.2 micron, said analysis being performed by the standard centrifugual-hydrometer method.

6. A coating pigment composition as in claim 5 in which the satin white content is present in an effective amount to retain the effectiveness of the satin white as a paper coating pigment on rewetting after drying but not greater than about 30%.

References Cited

UNITED STATES PATENTS

| | | | |
|---|---|---|---|
| 1,407,773 | 2/1922 | Ryan | 106—214 |
| 2,435,600 | 2/1948 | Rafton | 106—306 |
| 2,671,032 | 3/1954 | Thompson | 106—306 |
| 3,063,854 | 11/1962 | Claxton | 106—214 X |
| 3,066,035 | 11/1962 | Albert | 106—214 X |
| 3,075,710 | 1/1963 | Feld et al. | 241—16 |
| 3,085,894 | 4/1963 | Rowland | 106—306 |

LORENZO B. HAYES, Primary Examiner

U.S. Cl. X.R.

106—214; 117—156

UNITED STATES PATENT OFFICE
CERTIFICATE OF CORRECTION

Patent No. 3,625,725      Dated December 7, 1971

Inventor(s) Robert F. Conley et al

It is certified that error appears in the above-identified patent and that said Letters Patent are hereby corrected as shown below:

Column 2, line 33, "280°" should read -- 380° --; line 41, under the heading EXAMPLE III, "formulaion" should read -- formulation --. Column 6, line 46, "decidely" should read -- decidedly --.

Signed and sealed this 24th day of October 1972.

(SEAL)
Attest:

EDWARD M. FLETCHER, JR.
Attesting Officer

ROBERT GOTTSCHALK
Commissioner of Patents